July 19, 1949. A. COUTANT ET AL 2,476,705
CINEMATOGRAPHIC CAMERA
Filed Sept. 19, 1945 2 Sheets-Sheet 1

Inventors:
A. Coutant & J. Mathot
By E. F. Wenderoth
Atty

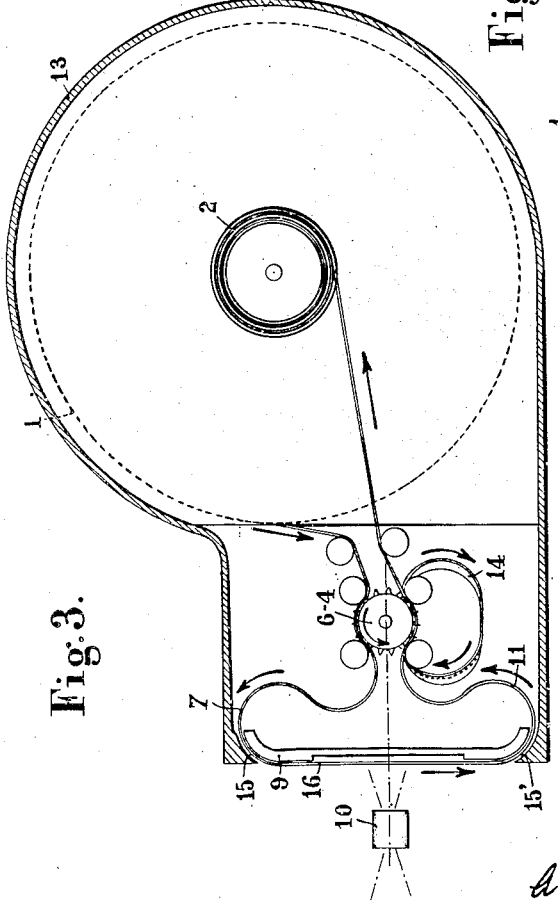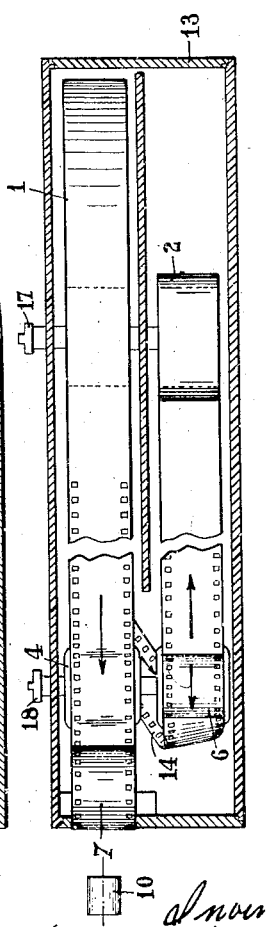

Patented July 19, 1949

2,476,705

UNITED STATES PATENT OFFICE 2,476,705

CINEMATOGRAPHIC CAMERA

André Coutant and Jacques Mathot, Paris, France

Application September 19, 1945, Serial No. 617,429
In France January 8, 1945

4 Claims. (Cl. 88—17)

1

This invention has for its object improvements in cameras with a view on one hand to make them less bulky and on the other hand to provide for an easier reel change while however avoiding a noisy travelling of the film which is highly detrimental to sound film recording.

In apparatus of the usual type the feeding and take-up reel magazines are arranged in one plane, the one through the gate and lens, in front of each other at the top of the aggregate; a construction is also known wherein the two said reels are still located in the plane through the gate and lens, however the one above and the other below said gate and lens; such machines are necessarily very bulky.

For the sake of compactness it has already been proposed to arrange the two reels coaxially at either side of the vertical plane through the lens and to have the film build two twisted loops, behind the feeding reel and before the take-up reel respectively, in order to transfer the film from the planes of said reels to the parallel plane through the axes of the gate and the lens and to allow its transitioning with the straight film length travelling through said gate; one drawback of this arrangement is that in the lengths forming twisted loops the film is advanced stepwise, which produces a highly objectionable snapping noise that makes silencing the machine an uneasy task.

This invention allows to avoid all these inconveniences: For that purpose, the camera with stepwise advanced film according to this invention is characterised notably thereby that the feeding and take-up reels, arranged preferably coaxially in parallel planes and the film-feeding means, are so designed that the film length or lengths providing the free twisted loop or loops built between the reel or reels and the straight film length passing through the gate for the purpose of transferring the film from the plane of said reels into the plane of said gate is or are formed in a zone or in zones where the motion imparted to the film is uniform.

With this end in view, where a twisted loop is built between the feeding reel and the straight length a feed roller having a uniform speed of rotation is provided before said straight length and the twisted loop is built before said roller; where the twisted loop is formed between the straight length and the take-up reel a feed roller having a uniform speed of rotation is provided behind said straight length and the twisted loop is built behind said roller.

In a preferred embodiment of this invention

2 the two reels are arranged side by side and coaxially behind the gate, a sprocket roller having a uniform speed is arranged between the gate and the reels and the twisted loop or loops is or are formed between the reel or reels and the drum.

Figures 3 and 4, illustrate a removable magazine in vertical and horizontal sectional view respectively.

Figure 1:
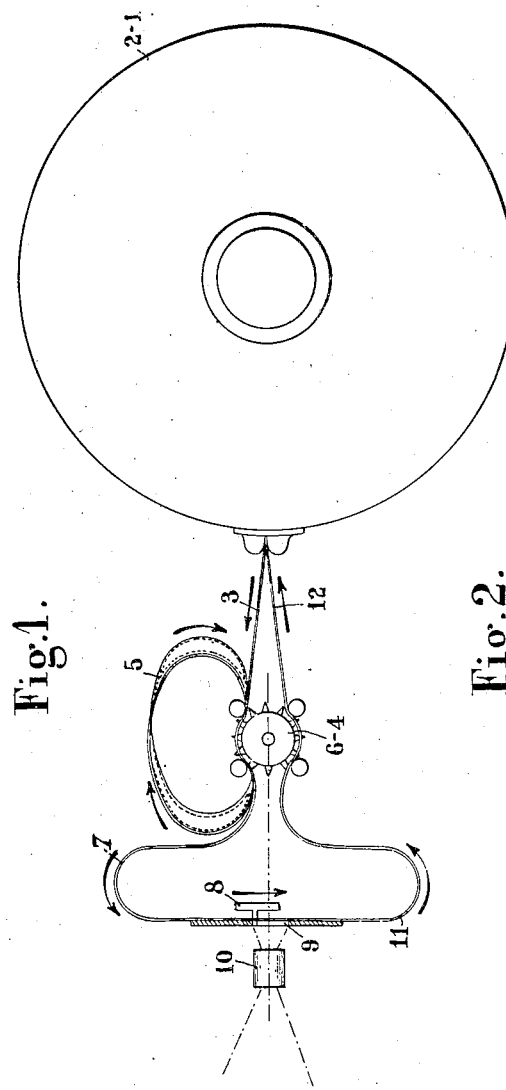
Figures 1 and 2 show diagrammatically the layout in side elevational and top plan view respectively.
Figure 2:
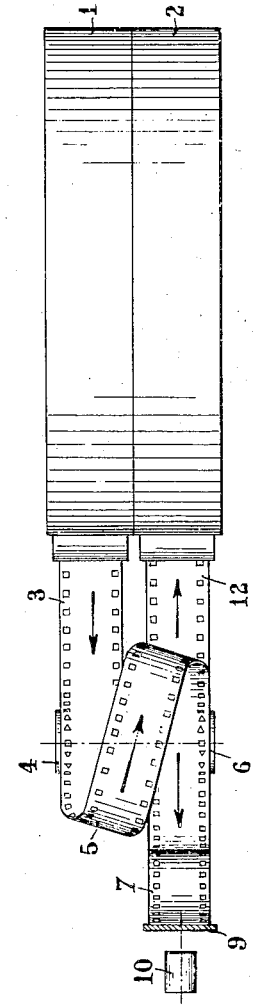

The feeding reel 1 and the take-up reel 2 are arranged side by side coaxially; the film length 3, which leaves the feed reel by the pull of the sprocket roller 4 which revolves at uniform speed, builds a twisted loop 5, passes over the sprocket roller 6 arranged at the side of sprocket roller 4 coaxially therewith and impelled by the same shaft with the same uniform rotational speed, builds the straight loop 7, is advanced stepwise by the prongs 8 through the gate 9 past the lens 10, builds the straight loop 11, passes under the sprocket roller 6 behind which the film length 12 is led to the take-up reel 2.

The removable magazine 13 shown in Figs. 3 and 4 comprises the same parts, designated by the same reference numerals, with the same film arrangement, but for the only difference that the gate and lens are no longer located in the plane through the take-up reel but in that of the feed reel; consequently, the twisted loop is provided behind the gate 9, below the sprocket roller 4, behind said roller and before the roller 6. The magazine 13 is closed and light-tight. Two slits 15 and 15' provide for the emergence of the straight loop 7 and the re-entry of the straight loop 11. The slits are sufficiently long and curved to exclude every detrimental consequence of a diffusion of the light penetrating from the outside through said slits. Only the straight length 16 of the film lies outside of the magazine 13, in addition to the ends 17 and 18 of the shafts for the rotation of reels 1 and 2 on one hand and of rollers 4 and 6 on the other hand.

What we claim as our invention and desire to secure by Letters Patent is:

1. A cinematographic camera with stepwise advanced film comprising a feeding and a take-up reel arranged in parallel planes, a lens and a sprocket feed roller having a uniform speed of rotation, both being arranged in the plane of the take-up reel, and a film fed from the feeding reel, building an ascending free closed twisted loop located in a vertical plane and generated by a rotation of 360° about a horizontal axis, coming into meshing engagement with the upper portion of said sprocket roller, traversed behind the lens through the gate with a stepwise motion and wound up on the take-up reel.

2. A cinematographic camera with stepwise advanced film comprising a feed and a take-up reel arranged in parallel planes, a lens and a sprocket feed roller having a uniform speed of rotation, both being arranged in the plane of the take-up reel and a film fed from the feeding reel, traversed behind the lens through the gate with a stepwise motion, coming into meshing engagement with the lower portion of the said sprocket roller, building a descending free closed twisted loop located in a vertical plane and generated by a rotation of 360° about a horizontal axis and wound up on the take-up reel.

3. A cinematographic camera with stepwise advanced film comprising a feeding and a take-up reel arranged in parallel planes, a pair of coaxial directly coupled sprocket rollers rotated at uniform speed and arranged each opposite one of the reels and a film having a straight section located between the feeding reel and the opposite sprocket roller meshing with the top portion of said roller, a further straight section located between the take-up reel and the opposite sprocket roller meshing with the bottom portion of said roller, a further straight section advanced stepwise running from the top portion one of the aforesaid sprocket rollers, moving past the photographing aperture and back round the lower portion of the same sprocket roller and a film section moving at uniform speed directly from one sprocket roller to the adjacent sprocket roller while forming a free closed twisted loop located in a vertical plane and generated by a rotation of 360° about a horizontal axis.

4. A removable magazine for cinematographic cameras comprising a take-up reel and a pay-off reel arranged side by side coaxially, a pair of coaxial sprocket rollers rigidly coupled with each other arranged each opposite one of the reels and a film having a straight section located between the pay-off reel and the opposite sprocket roller meshing with the top portion of said roller, a further straight section located between the take-up reel and the opposite sprocket roller meshing with the bottom portion of said roller and a film section running directly from the one to the other of the companion sprocket rollers while forming a free closed twisted loop located in a vertical plane and generated by a rotation of 360° about a horizontal axis.

ANDRÉ COUTANT.
JACQUES MATHOT.

REFERENCES CITED

The following references are of record in the file of this patent:

UNITED STATES PATENTS

| Number | Name | Date |
| --- | --- | --- |
| 698,125 | Meester | Apr. 22, 1902 |
| 1,087,083 | Debrie | Feb. 10, 1914 |
| 1,368,860 | Taifirnopoulos | Feb. 15, 1921 |
| 1,369,127 | Ray | Feb. 22, 1921 |
| 1,888,574 | Schabet | Nov. 22, 1932 |
| 1,891,262 | Hayden | Dec. 20, 1932 |
| 1,984,111 | Bouveng | Dec. 11, 1934 |
| 2,026,984 | Lyman | Jan. 7, 1936 |
| 2,055,492 | Holst | Sept. 29, 1936 |
| 2,238,719 | Tartas | Apr. 15, 1941 |
| 2,319,530 | Bolsey | May 18, 1943 |
| 2,372,405 | Tondreau | Mar. 27, 1945 |

FOREIGN PATENTS

| Number | Country | Date |
| --- | --- | --- |
| 459,672 | France | Sept. 12, 1913 |